United States Patent Office 3,732,173
Patented May 8, 1973

3,732,173
MANUFACTURE OF WATER-SOLUBLE CATIONIC NON-THERMOSETTING METHYLAMINE-EPICHLOROHYDRIN POLYMER AT CONSTANT TEMPERATURE
Daniel Elmer Nagy, Fairfield, Conn., assignor to American Cyanamid Company, Stamford, Conn.
No Drawing. Continuation-in-part of application Ser. No. 778,934, Nov. 26, 1968, now Patent No. 3,567,659. This application Jan. 4, 1971, Ser. No. 103,836
The portion of the term of the patent subsequent to Mar. 2, 1988, has been disclaimed
Int. Cl. C08g 23/12, 43/00
U.S. Cl. 260—2 BP                5 Claims

ABSTRACT OF THE DISCLOSURE

A hydrophilic water-dispersible cationic storage stable methylamine-epichlorohydrin polymer is prepared by reacting 1 mol of methylamine with 0.8–1.2 mol of epichlorohydrin to produce a cationic and water-dispersible polymer and substantially completely reacting said polymer at a pH above 8 and temperature above 80° C. said polymer with successively small increments of epichlorohydrin until the polymer is close to being a gel. Preferably, the last increment is large enough to cause the solution to gel if completely reacted, and a monofunctional amine is added when the viscosity of the solution is just short of the gel point to arrest further progress of the reaction.

---

This is a continuation-in-part of my copending application Ser. No. 778,934, filed Nov. 26, 1968, now U.S. Pat. No. 3,567,659.

The present invention relates to a water-dispersible, cationic, storage-stable methylamine-epichlorohydrin condensation polymers.

My said copending application discloses a method for the preparation of methylamine-epichlorohydrin condensation polymers by a process wherein one mol of methylamine is reacted with epichlorohydrin in sufficient amount between 0.8 and 1.2 mol to produce a polymer which is cationic and water-dispersible, and the resulting polymer is reacted successively but not completely with very small increments of epichlorohydrin until the polymer is close to but short of the point at which the polymer becomes an irreversible gel. Thereafter, sufficient of a water-soluble primary or secondary amine is added to stop the reaction and render the polymer storage-stable.

In the process, after addition of the last increments of epichlorohydrin the viscosity of the reaction mixture rises rapidly and almost uncontrollably. The process thus requires that the reaction steps be predetermined in each instance so that the rise in viscosity does not carry the polymer into the insoluble gel stage.

Moreover, the process requires the product be subjected to a depolymerization step. The process thus requires chemical control.

Furthermore, the process involves major variations in the temperature and viscosity of the reaction mixture. The process thus requires close engineering control.

Finally, the process requires the addition of amine at its close. The process thus requires a special metering step.

The discovery has now been made that the small increments of epichlorohydrin (referred to above) can be made to react substantially completely and rapidly, and without undergoing significant hydrolysis to glycerol, by performing this part of the process while the solution has a pH in excess of 8 and while it has a temperature in excess of 80° C.

According to the invention, therefore, the polymer is prepared by a process which has only two principal steps. In the first step, one mol of methylamine in aqueous solution is substantially completely reacted with epichlorohydrin in sufficient amount between 0.8 and 1.2 mol. During this part of the process the pH of the solution is above 8 and the temperature of the solution is above 70° C.

In the second step, increments of epichlorohydrin, each smaller than 0.1 mol per mol of the methylamine originally taken, are added at such a rate that each increment reacts substantially completely with the methylamine residues in the polymer before the next is added, until the polymer is close to but is short of the point at which it becomes an irreversible gel. In this step, the pH of the solution is above 8, and the temperature of the solution is 80° C. and preferably is above 90° C. As a result, complete reaction of the increments occurs rapidly. The product is an aqueous solution of a water-soluble-storage-stable polymer, which contains substantially no glycerol.

From the foregoing it will be seen that the process of the present invention reperesents a substantial advance over the process of my parent application.

I have further found that a product of higher molecular weight and superior efficiency can be safely prepared by (1) adding (after the last increment of epichlorohydrin has been added and after it has been allowed to react substantially completely) a final small increment of epichlorohydrin (sufficient to carry the polymer solution to the gel point if completely reacted), and when the viscosity of the solution is substantially at but is short of the gel point and the process is completed in less time than heretofore through possible (2) adding a water-soluble amine having a functionality of not more than 2 as agent arresting a further increases in the viscosity of the solution. The amine acts as chain-stopper and prevents further increase in the size of the polymeric macromolecules.

More in detail, manipulatively the process of the present invention is performed in essentially the same manner and in substantially the same apparatus as is described in my parent application. Thus, a low-pressure, jacketed reaction vessel is employed containing an efficient stirrer for the viscous syrup which is formed, provision being made to supply the jacket first with cold water to control the exotherm which develops and then with hot water or steam to maintain the reaction mixture above about 90° C. during the second step.

The methylamine is first charged into the reactor as an aqueous solution at room temperature, and the epichlorohydrin is then run in at such a rate that the temperature of the reaction mixture does not rise above about 40° C., thereby avoiding volatilization of methylamine on the one hand and avoiding need for a high pressure vessel on the other. When all of the epichlorohydrin has been added and the exotherm has largely subsided, the temperature is allowed to rise to above 80° C. and preferably above 90° C. or close to the boil. As the epichlorohydrin is added, the pH of the reaction mixture is maintained between about 8 and about 9 by addition of any non-volatile, strong water-soluble alkali. The reaction forms ionic chlorine.

The amount of water present in the reaction mixture is sufficient to maintain the mixture at stirrable viscosity.

The remaining increments of epichlorohydrin may be added without special precautions after the temperature of the reaction mixture has been increased to about 90° C. Each increment reacts substantially completely in less than about 60 minutes, as determined by substantial cessation of the formation of ionic chlorine.

The pH of the reaction mixture should be about 8 during the first part of the first step (i.e., until the exotherm has subsided), after which it may be raised to 8.5 and held there for the remainder of the step. In the second step, the pH of the reaction mixture should be at least 8, and may be 9 if desired. Much higher pH values may be employed, but appear to confer no advantage.

In the second step, it is critical that the temperature of the reaction mixture be above about 90° C. and that the pH of the mixture be above about 8. At a pH of about 7, the reaction mixture forms a premature gel, and at temperatures below about 90° C. reaction of the last increments of epichlorohydrin takes place unduly slowly or not at all.

The water-soluble amines which are added to arrest further reaction of the epichlorohydrin have a functionality of 1 or 2, and include methylamine, dimethylamine, ethylamine, diethylamine, and aniline. Methylamine is very effective for this purpose and for this reason and because of its ready availability this compound is preferred.

The reaction mixture may contain other materials which have heretofore been present in amine-epichlorohydrin reactions, and which do not affect the essential character thereof, for example, small amounts of an alcohol such as isopropanol, methylanol, ethylene glycol or propylene glycol to decrease the viscosity of the reaction mixture; a compatible dye or pigment to provide the product with a distinctive color, or a perfume to mask any odor which the product may possess.

The product is useful as flocculant for the solids in sewage and as a dry strengthening agent for paper, in the same manner as the product of my parent application.

The invention is more particularly described by the example which follow. These examples are a best embodiment of the invention and are not to be construed in limitation thereof.

EXAMPLE 1

The following illustrates a large-scale semiautomatic method for forming a storage-stable cationic water-soluble cationic polymer according to the present invention.

In a kettle equipped with stirrer, reflux condenser, temperature recorder, and jacket for heating and cooling are charged 1,291 lb. of water and 884 lb. of a 43% by weight solution of methylamine in water (12.25 mol) at room temperature. Then 936 lb. of 98% epichlorohydrin (9.92 mol) is uniformly run in over 3 hours; the temperature is held at 25°–40° C. during the first half of the reaction and at 50°–80° C. during the second half of the reaction by passing cold water through the jacket. The methylamine:epichlorohydrin molar ratio in this step is 1.0:0.8.

When the exotherm has subsided, 455 lb. of 50% by weight aqueous sodium hydroxide solution is added, and at the same time the temperature of the reaction mixture is raised to 94° C. The pH of the solution at this point is 9.0 and the viscosity of the solution is 13 seconds on a Ford No. 4 cup.

During the next six 40-minute periods there were added six portions of 98% epichlorohydrin, the first two weighing 20 lb. each, and the last four respectively weighing 10, 3, 1 and 1 lb. each. After each addition, the Ford cup viscosities of the reaction mixture are 12.0, 12.6, 14.0, 17.0, 19.8 and 24.8.

A sample of the batch is withdrawn and maintained at 94° C. for three hours. The viscosity of the material does not change perceptibly, and the material is water-soluble. It is close to but safely short of the gel point.

EXAMPLE 2

The procedure of Example 1 is repeated, and to the end product there is added with stirring one pound of epichlorohydrin. During the ensuing two hours the Ford cup viscosity of the polymer rises from 25 to 50 seconds, and the polymer is substantially at but just short of gelation. At this point 8 lb. of monomethylamine as a 40% by weight solution in water is rapidly added with stirring, whereby further increases in viscosity is arrested. The solution is cooled and is stable on storage at 30° C. for six months.

The polymers of Examples 1 and 2 are water-soluble, hydrophilic and cationic, and are excellent flocculants for the suspended solids in sewage and effective strengthening agents for use in the manufacture of paper. The polymer of Example 2, however, is considerably better for these purposes than the polymer of Example 1 because of its higher molecular weight.

I claim:
1. A process for preparing a hydrophilic water-dispersible cationic methylamine-epichlorohydrin polymer which is storage-stable, which consists essentially in substantially completely reacting in aqueous solution having a pH above 8, one mol of methylamine with epichlorohydrin in sufficient amount between 0.8 and 1.2 mol to produce a polymer which is cationic and water-dispersible, and adding to said solution while said solution has a pH above 8 and a temperature above 80° C. increments of epichlorohydrin each smaller than about 0.1 mol per mol of said methylamine at such rate that each increment reacts substantially completely before the next is added until the polymer is close to but short of the point at which it becomes an irreversible gel.

2. A process according to claim 1 wherein the temperature of the solution during reaction of all the epichlorohydrin incrementally added is above 90° C.

3. A process according to claim 1 wherein the pH of the solution during reaction of all the epichlorohydrin incrementally added is about 9.

4. A process for preparing a hydrophilic water-dispersible cationic methylamine-epichlorohydrin polymer which is storage-stable, which consists essentially in substantially completely reacting in aqueous solution having a pH above 8, one mol of methylamine with epichlorohydrin in sufficient amount between 0.8 and 1.2 mol to produce a polymer which is cationic and water-dispersible, adding to said solution while said solution has a pH above 8 and a temperature above 80° C. increments of epichlorohydrin each smaller than about 0.1 mol per mol of said methylamine at such rate that each increment reactions substantially completely before the next is added until the polymer is close to but short of the point at which it becomes an irreversible gel, adding a final increment of epichlorohydrin and, when the viscosity of the solution is substantially at but short of the gel point, adding a water-soluble amine having a functionality not more than 2 as agent arresting a further increase in the viscosity of the solution.

5. A process according to claim 4 wherein the amine is methylamine.

References Cited
UNITED STATES PATENTS

| | | | |
|---|---|---|---|
| 3,493,502 | 2/1970 | Coscia | 210—54 |
| 3,497,556 | 2/1970 | Lanner et al. | 260—584 |
| 3,567,659 | 3/1971 | Nagy | 260—2 BP |

HAROLD D. ANDERSON, Primary Examiner

E. A. NIELSEN, Assistant Examiner

U.S. Cl. X.R.

162—164; 210—54; 260—2 BP, 584 R

UNITED STATES PATENT OFFICE
CERTIFICATE OF CORRECTION

Patent No. 3,732,173          Dated May 8, 1973

Inventor(s) DANIEL ELMER NAGY

It is certified that error appears in the above-identified patent and that said Letters Patent are hereby corrected as shown below:

Column 1 lines 34-36. After "to a" insert -- method for the preparation of hydrophilic, water-soluble or --.
Column 2 line 21; "reperesents" should read -- represents --;
Column 3 lines 31-32. "example" should read -- examples --.
Column 4 line 47. "reactions" should read -- reacts --.

Signed and sealed this 25th day of December 1973.

(SEAL)
Attest:

EDWARD M. FLETCHER, JR.          RENE D. TEGTMEYER
Attesting Officer                Acting Commissioner of Patents